United States Patent
Lamb et al.

(10) Patent No.: US 12,221,268 B2
(45) Date of Patent: Feb. 11, 2025

(54) STAIN RESISTANT PACKAGING FILM FOR RETORT APPLICATIONS

(71) Applicant: AMCOR FLEXIBLES NORTH AMERICA, INC., Neenah, WI (US)

(72) Inventors: James R. Lamb, Neenah, WI (US); Carol W. Umphlett, Neenah, WI (US); Curtis R. Barr, Neenah, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 472 days.

(21) Appl. No.: 17/624,517

(22) PCT Filed: Aug. 4, 2020

(86) PCT No.: PCT/US2020/044909
§ 371 (c)(1),
(2) Date: Jan. 3, 2022

(87) PCT Pub. No.: WO2021/026173
PCT Pub. Date: Feb. 11, 2021

(65) Prior Publication Data
US 2022/0355998 A1 Nov. 10, 2022

Related U.S. Application Data

(60) Provisional application No. 62/882,955, filed on Aug. 5, 2019.

(51) Int. Cl.
*B32B 27/08* (2006.01)
*B32B 27/20* (2006.01)
(Continued)

(52) U.S. Cl.
CPC .............. *B65D 81/34* (2013.01); *B32B 27/08* (2013.01); *B32B 27/20* (2013.01); *B32B 27/32* (2013.01);
(Continued)

(58) Field of Classification Search
CPC ...... B65D 81/34; B65D 75/008; B32B 27/08; B32B 27/20; B32B 27/32; B32B 27/34;
(Continued)

(56) References Cited

U.S. PATENT DOCUMENTS 5,407,751 A    4/1995   Genske et al.
5,853,862 A   12/1998   Murai et al.
(Continued)

FOREIGN PATENT DOCUMENTS

CN     1159291 A    9/1997
CN   101443187 A    5/2009
(Continued)

OTHER PUBLICATIONS

Translation of JP-2003305811-A (Year: 2003).*
PCT International Search Report, International Application No. PCT/US2020/044909, issued Dec. 8, 2020, 2 pages.

*Primary Examiner* — Brent T O'Hern

(57) ABSTRACT

To reduce the amount of staining that occurs during the in-package retort processing of food products, a packaging film is used including a white multilayer film, the white multilayer film having a sealing region on the exposed surface of the packaging film, a white region containing white pigment and a blocking region located between the white region and the sealing region, where the combined thickness of the sealing region and the blocking region is at least 70% of the thickness of the white multilayer film.

20 Claims, 2 Drawing Sheets

(51) Int. Cl.
    *B32B 27/32*     (2006.01)
    *B32B 27/34*     (2006.01)
    *B32B 27/36*     (2006.01)
    *B65D 75/00*     (2006.01)
    *B65D 81/34*     (2006.01)
    *B32B 7/12*     (2006.01)

(52) U.S. Cl.
    CPC .............. *B32B 27/34* (2013.01); *B32B 27/36* (2013.01); *B65D 75/008* (2013.01); *B32B 7/12* (2013.01); *B32B 2250/24* (2013.01); *B32B 2255/10* (2013.01); *B32B 2255/20* (2013.01); *B32B 2255/28* (2013.01); *B32B 2307/4026* (2013.01); *B32B 2307/412* (2013.01); *B32B 2307/518* (2013.01); *B32B 2307/558* (2013.01); *B32B 2307/7244* (2013.01); *B32B 2307/7246* (2013.01); *B32B 2307/732* (2013.01); *B32B 2439/70* (2013.01)

(58) Field of Classification Search
    CPC ....... B32B 27/36; B32B 7/12; B32B 2250/24; B32B 2255/10; B32B 2255/20; B32B 2255/28; B32B 2307/4026; B32B 2307/412; B32B 2307/518; B32B 2307/558; B32B 2307/7244; B32B 2307/7246; B32B 2307/732; B32B 2439/70
    USPC ........................................................ 426/127
    See application file for complete search history.

(56) References Cited

U.S. PATENT DOCUMENTS

| | | | |
|---|---|---|---|
| 6,599,639 | B2 | 1/2003 | Dayrit et al. |
| 7,314,669 | B2 | 1/2008 | Galloway |
| 8,927,075 | B2 | 1/2015 | Gibanel et al. |
| 10,286,628 | B2 | 5/2019 | Timmerman et al. |
| 2006/0210742 | A1 | 9/2006 | Bekele |
| 2007/0000568 | A1 | 1/2007 | Bohme et al. |
| 2009/0274918 | A1 | 11/2009 | Endo et al. |
| 2010/0068433 | A1 | 3/2010 | Gibanel et al. |
| 2013/0302591 | A1 | 11/2013 | Timmerman et al. |
| 2014/0248450 | A1 | 9/2014 | Sasaki et al. |
| 2015/0053680 | A1 | 2/2015 | Yuno et al. |

FOREIGN PATENT DOCUMENTS

| | | | |
|---|---|---|---|
| CN | 108884284 A | | 11/2018 |
| EP | 1232855 A2 | | 8/2002 |
| EP | 1541340 A1 | | 6/2005 |
| JP | 2003305811 A | * | 10/2003 |
| JP | 2005231041 A | | 9/2005 |
| JP | 4777590 B2 | | 9/2011 |
| WO | 0232658 A1 | | 4/2002 |
| WO | 2013101931 A1 | | 7/2013 |

\* cited by examiner

STAIN RESISTANT PACKAGING FILM FOR RETORT APPLICATIONS

TECHNICAL FIELD

This disclosure is related to film structures, in particular white film structures to be used for packaging food in retort applications. The laminates described herein exhibit reduced staining from food products.

BACKGROUND

Retort operations are used for thermal processing of food and sterilization of the primary packaging components. Food packaged in a retortable container, is transferred to an autoclave unit where it is subjected to retort conditions including humid or wet environments, temperatures generally exceeding the boiling point of water and elevated pressures, for a specific time period. Retortable containers, therefore, are designed to withstand retort conditions.

The use of multilayer flexible high-barrier films for packaging food items that are retort sterilized is common. For example, a flexible film may be heat sealed into the form of a stand-up pouch, filled with a food product and hermetically sealed prior to retort processing. Another common package format for retort processing is a polymeric or metal tray to which a flexible lid is heat sealed to hermetically enclose the food product. A wide variety of food products may be enclosed inside the retort packages, including soups, vegetables or pasta with sauce.

Often the packaging film is printed with graphics suitable for retail sale of the food product. As a backdrop for the graphics, a portion of the film is usually pigmented white. This is typically done by either including a solid white ink layer along with the graphics, or by pigmenting one of the polymeric layers of the film that is behind the printed graphics.

When using a pigmented white film, the film can become stained by the food product during the retort process. The stain may be uneven and yellow, providing for an undesirable appearance to the package. In some cases, the pigmented white film may use a blocking layer that contains a polymer such as polyamide or ethylene vinyl alcohol copolymer (EVOH). These polymers can prevent the food components from staining the white film. However, in some cases it is desirable to avoid use of polyamide and/or EVOH as they add cost and complexity to the structure as well as creating an overall film structure that is more difficult to recycle.

SUMMARY

Disclosed herein are packaging films for retort processing which resist staining that may occur due to the food product components. The packaging films contain a white multilayer film, the white multilayer film having a) a sealing region located on an exposed surface of the packaging film, b) a white region comprising a white pigment in an amount from 3.5% to 35% by weight and a propylene-based polymer, and c) a blocking region, the blocking region located between the sealing region and the white region. The sealing region and the blocking region each contain a propylene-based polymer and are each essentially free from the white pigment. The combined thickness of the sealing region and the blocking region is at least 70% of the white multilayer film thickness. A packaged food product may be produced using the packaging film, and the white region of the multilayer film will stain less than similar conventional packaging films.

Another embodiment of a stain resistant packaging film for retort processing may include a white multilayer film having a) a sealing region located on an exposed surface of the packaging film, b) a white region, and c) a blocking region, the blocking region located between the sealing region and the white region. The white region comprises a propylene-based polymer and a white pigment in an amount from 3.5% to 35% by weight, the sealing region and the blocking region each contain a propylene-based polymer and are each essentially free from the white pigment, and the combined thickness of the sealing region and the blocking region is at least 2.7 mil (68.6 microns).

Another embodiment of a stain resistant packaging film for retort processing has an external abuse layer, a barrier layer and a white multilayer film, the white multilayer film having a first major surface and a second major surface. The white multilayer film has a sealing region having a polypropylene-based polymer, the sealing region located on the first major surface of the white multilayer film and on an exposed surface of the packaging film, and a white region, the white region having thickness that is 30% or less of the white multilayer film thickness, and located on the second major surface of the white multilayer film. The barrier layer is between the external abuse layer and the white multilayer film, the white region comprises a white pigment between 3.5% and 35% by weight, and the white multilayer film is otherwise essentially free of white pigment.

BRIEF DESCRIPTION OF THE DRAWINGS

The disclosure may be more completely understood in consideration of the following detailed description of various embodiments of the disclosure in connection with the accompanying drawings, in which.

Figure 1A:
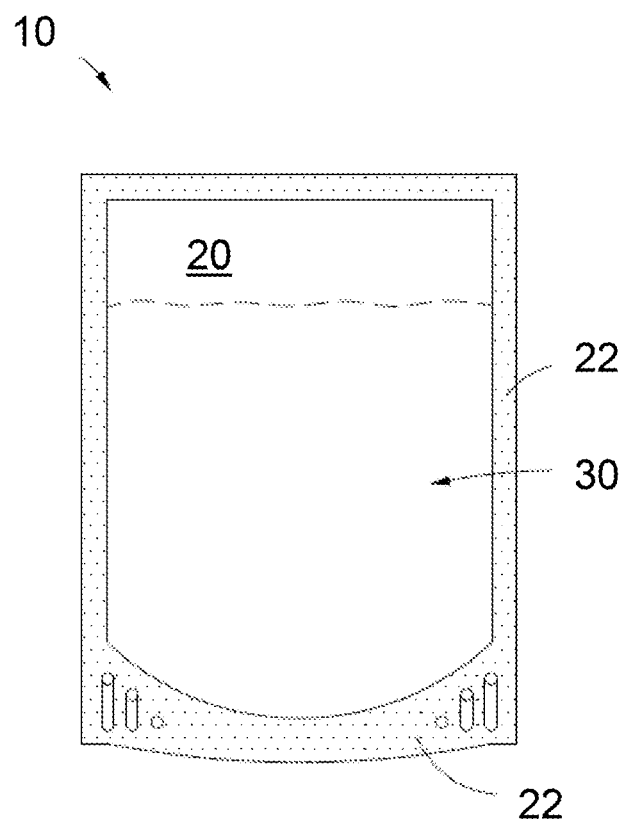
FIGS. 1A and 1B are plan views of exemplary packaged products that use a stain-resistant packaging film.

The drawings show some but not all embodiments. The elements depicted in the drawings are illustrative and not necessarily to scale, and the same (or similar) reference numbers denote the same (or similar) features throughout the drawings.

DETAILED DESCRIPTION

Described herein are stain resistant packaging films that include a white multilayer film, suitable for use in retort processes. The packaging film can be used to construct a package that is filled with a food product. The package is then hermetically sealed and then retort processed. The films described herein exhibit reduced staining and have an improved appearance after retort processing.

Figure 1B:
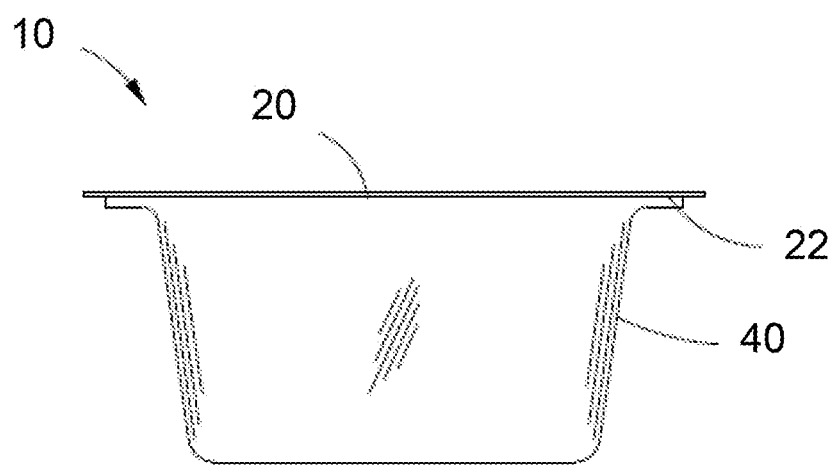

The stain resistant packaging film can be used in a wide variety of packaged products. The package may have any suitable format including, but not limited to, those shown in FIGS. 1A and 1B. FIG. 1A is a packaged product 10 having the format of a stand-up pouch, as is typical for a variety of retail food products. A stand-up pouch has a front and back panel and a gusset panel, at least one of which is made from the stain resistant packaging films disclosed herein. As shown, at least the front panel includes the stain resistant packaging film 20, as the front is likely the most critical for having an optimal visual appearance with minimized product staining. The panels of the stand-up pouch are connected by heat seals 22 thereby containing the product 30 therein. FIG. 1B is a packaged product 10 having the format of a formed cup or tray 40, with a stain resistant packaging film 20 as a lid attached by heat seal 22 to the cup or tray 40. The stain resistant packaging film is heat sealed to itself, another stain resistant packaging film or another packaging component by way of the sealing region of the film. While the packages described herein are described by heat seal formation, packages of the invention are not limited to heat sealing and may be assembled by other sealing processes, such as ultrasonic sealing.

Food products that may be packaged in retort packages include, but are not limited to, rice or pasta with sauce, beans, gravies or soups. Food products that are particularly prone to staining the packaging and would benefit most from the stain resistant packaging film are those with high fat or oil content and those with a strong color.

The stain resistant packaging films described herein use a specific white multilayer film that has been pigmented white. The white pigment is added to specific layers, and is prohibited in specific layers, to help limit the staining of the film. In addition to the white multilayer film, some embodiments of the packaging film have an exterior abuse layer and a barrier layer.

The term "layer", as used herein, refers to a building block of a film that is a structure of a single material type or a homogeneous blend of materials. A layer may be a single polymer, a blend of materials within a single polymer type or a blend of various polymers, may contain metallic materials and may have additives. Layers may be continuous with the film or may be discontinuous or patterned. A layer has an insignificant thickness as compared to the length and width, and therefore is defined to have two major surfaces, the area of which are defined by the length and width of the layer. An exterior layer is one that is connected to another layer at only one of the major surfaces. In other words, one major surface of an exterior layer is exposed. An interior layer is one that is connected to another layer at both major surfaces. In other words, the layer is between two other layers.

The term "region", as used herein, refers to one or more layers directly adjacent to and connected to each other. A region may contain layers of identical or different material makeup.

Similarly, the term "film", as used herein, refers to a web built of layers and/or regions and/or films, all of which are directly adjacent to and connected to each other. A film can be described as having a thickness that is insignificant as compared to the length and width of the film. A film has two major surfaces, the area of which are defined by the length and width of the film.

Figure 2:
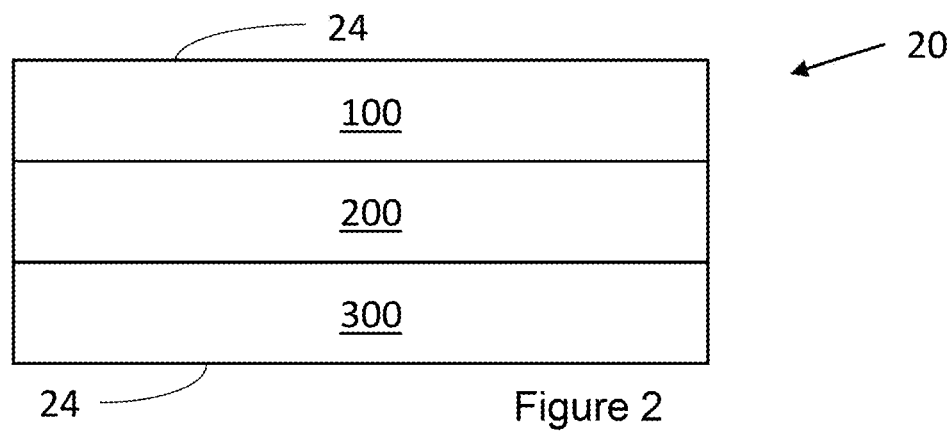
FIG. 2 is a cross-sectional view of an exemplary stain resistant packaging film.

A cross-sectional view of an exemplary stain resistant packaging film 20 is shown in FIG. 2. The packaging film 20 has an exterior abuse layer 100 on one of the exposed major surfaces 24 and a white multilayer film 300 on the other exposed major surface 24. A barrier layer 200 is between the exterior abuse layer 100 and the white multilayer film 300. There may be adhesives or primers between the shown layers and films. Bonding of the layers and films may be done by any methods known to those familiar with film converting.

The exterior abuse layer may have any composition. The exterior abuse layer may be an oriented film such as biaxially oriented polyamide (BOPA) film, biaxially oriented polyester (OPET) film or biaxially oriented polypropylene (BOPP) film, as are typically used in flexible packaging films. The exterior abuse layer may be a coated abuse resistant lacquer. The exterior abuse layer may be a single layer in a multilayer film. The thickness of the exterior abuse layer may be from about 1 microns to about 50 microns, preferably between 2 microns and 25 microns. The exterior abuse layer is transparent such that any printed indicia and the white multilayer film portion of the stain resistant packaging film can be viewed through the exterior abuse layer.

The barrier layer of the stain resistant packaging film ensures that the film has a low oxygen and/or moisture transmission rate and the packaged product will maintain high quality over the shelf-life. Some packaged products that are retort processed can remain stable at non-refrigerated conditions over extended periods of time (i.e. more than one year), as long as the package has adequate barrier properties. The barrier layer may be of any material known to be used in retort packaging, such as inorganic oxide coatings. Inorganic oxide coatings provide excellent barrier and are transparent, allowing the white multilayer film to be viewed through the barrier layer. The barrier layer may be of any other composition, as long as it is transparent and does not contradict the purpose of the packaging films described herein.

The barrier layer of the stain resistant packaging film is between the exterior abuse layer and the white multilayer film. In some embodiments the barrier layer is directly adjacent to and connected to the exterior abuse layer. In some embodiments the barrier layer is attached to or part of another film or layer and the entire composite is located between the exterior abuse layer and the white multilayer film.

The white multilayer film is located on one of the major surfaces of the stain resistant packaging film and provides the white appearance and opacity for the film. Details of the white multilayer film will be discussed below.

Additionally, the packaging film may include layers of printed indicia. The printed indicia are typically discontinuous layers of ink pigment placed between the layers and/or films, and viewable through the exterior abuse layer. These printed indicia are the graphics seen on the final package.

The stain resistant packaging film may have one or more layers for the functionality of adhesion, such as tie layers or adhesive layers. The term "tie layer," "adhesive", "adhesive layer," or "adhesive coating," refers to a material placed on one or more layers, partially or entirely, to promote the adhesion of that layer to another surface. A "tie layer" refers to a polymeric based material that is coextruded with other layers for the purpose of providing adhesion between two other layers. Such layers are positioned between two films, regions or layers to maintain the two materials in position relative to each other and prevent undesirable delamination.

The stain resistant packaging film may contain other functional layers, such as, but not limited to, bulk layers, layers for stiffness, or additional barrier layers, as long as the content of these layers does not frustrate the retortability, stain resistance or overall functionality of the film. The thickness of the stain resistant packaging film may be from about 50 microns to about 500 microns, preferably between 50 microns and 200 microns.

Figure 3:
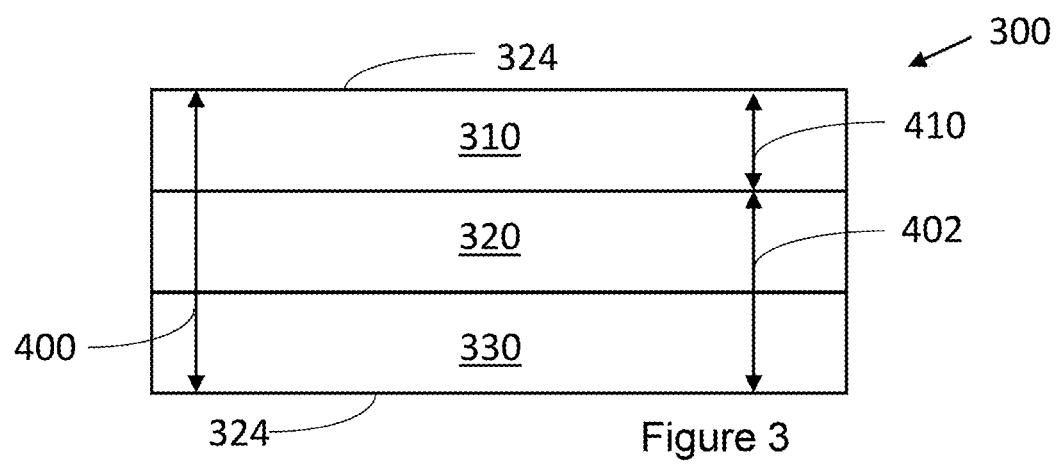
FIG. 3 is a cross-sectional view of an exemplary white multilayer film that may be used in a stain resistant packaging film.

The cross-section of an exemplary white multilayer film to be used in a stain resistant packaging film is shown in FIG. 3. In this embodiment the film 300 consists of a sealing region 330, located on one of the major surfaces 324 of the white multilayer film, a white region, 310, located on the opposite major surface 324, and a blocking region 320 located between the sealing region 330 and the white region 310. The blocking region 320 is also directly adjacent to and connected to the other two layers. Also shown in FIG. 3 is a thickness of the white multilayer film, indicated by the double headed arrow labeled as 400. Similarly, arrows 410 and 402 indicate the thickness of the white region and the combined thickness of the sealing region and the blocking region, respectively.

Figure 4:
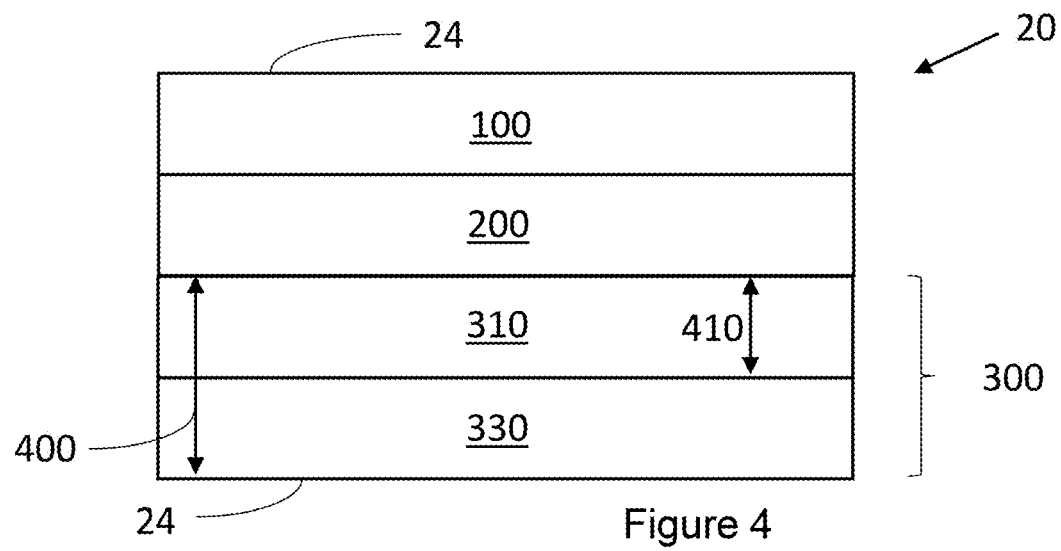
FIG. 4 is another cross-sectional view of an exemplary stain resistant packaging film.

The cross-section of an exemplary stain resistant packaging film is shown in FIG. 4. In this embodiment, the stain resistant packaging film 20 has an exterior abuse layer 100 located on an exposed major surface 24, a white multilayer film 300 and a barrier layer 200 located between the exterior abuse layer 100 and the white multilayer film 300. The white multilayer film 300 has white region 310 and a sealing region 330. Also shown in FIG. 4 is a thickness of the white multilayer film, indicated by the double headed arrow labeled as 400, and a thickness of the white layer 410.

The white multilayer film may be assembled by any known means, either in a single process, or consecutive steps. Ideally, the white multilayer film is fully coextruded in a single processing step, by either blown film extrusion or cast extrusion. The total thickness of the white multilayer film may be from about 50 microns to about 450 microns, preferably between 50 microns and 175 microns.

As stated, some embodiments of the white multilayer film have a sealing region and a white region. Some white multilayer films benefit from an additional blocking region between the sealing region and the white region. Some embodiments of the white multilayer film consist of a sealing region, a blocking region and a white region. Each region may have one or more layers, as will be discussed. Ideally, the white multilayer film is free from (or essentially free from) polyamide and/or EVOH containing layers. Films that contain either polyamide or EVOH are inherently stain resistant as these materials effectively block the passage of staining components to the white layers. The solutions described herein are applicable to stain resistant packaging films that have a barrier layer outside of the white multilayer film, such as the inorganic oxide layers described herein.

As stated, the sealing region of the white multilayer film is located on the exposed surface of the stain resistant packaging film and is therefore also located on one of the major surfaces of the white multilayer film. The function of this layer is to provide good seals for the package. Appropriate formulations for the sealing region are those known to perform well in retort processing, typically incorporating blends of various types of propylene-based polymers such as polypropylene homopolymer, polypropylene impact copolymer, polypropylene random copolymer, heterophasic polypropylene copolymers. Ideally, the sealing region contains a blend of propylene-based polymers including polypropylene homopolymer in an amount up to about 10% by weight. In some embodiments the sealing region has a blend containing a rubber modified polypropylene copolymer and up to 10% by weight polypropylene homopolymer.

The sealing region may be made of one or more layers. The thickness of the sealing region should be between about 8 microns and about 50 microns. When the stain resistant packaging film is used in a packaged product, the sealing region is in direct contact with the product and/or the headspace of the package. Ideally, the sealing region does not contain any white pigment.

Some embodiments of the stain resistant packaging film have a blocking region located between the white region and the sealing region. This layer can more specifically be formulated to help block the staining components since this layer does not have the burden of having to perform the sealing function. The blocking region may contain a blend including a polypropylene homopolymer. The polypropylene homopolymer may be present in the blocking region at a level from about 30% to 100%, by weight. The polypropylene homopolymer may be present in the blocking region at a level at least 20%, by weight. The level of polypropylene homopolymer present in the blocking region can be changed, depending on the thickness of the blocking region. A thicker blocking region may contain less polypropylene homopolymer and still have the same stain blocking performance. Some embodiments of the stain resistant packaging film have a blocking region containing a blend of a propylene-ethylene copolymer and a polypropylene homopolymer, where the homopolymer is present at a level of at least 10% by weight. Some embodiments of the stain resistant packaging film have a blocking region containing a rubber modified polypropylene copolymer in a level of 0% to 10% by weight.

Some propylene-based copolymers contain a polypropylene homopolymer phase which can also aid in blocking the staining components. It has been found that using propylene-based polymer blends that minimize the rubber modified content and/or maximize the polypropylene homopolymer content greatly reduces the transfer (i.e. blocks) of staining components from the food product to the white concentrate. In addition to this blend consideration, it is also critical that the blocking layer not contain any white pigment.

The blocking region may contain more than one layer and each layer may have a different blend of propylene-based polymers. Some of the layers in the blocking region may not have any homopolymer polypropylene. Ideally, the blocking region does not contain any white pigment. In some embodiments of the stain resistant packaging film, the combined thickness of the white region and the blocking region is at least 70% of the thickness of the white multilayer film. In some embodiments of the stain resistant packaging film, the combined thickness of the white region and the blocking region is at least 68.5 microns.

The white multilayer film should have a white region containing white pigment. The white pigment used in films is typically titanium dioxide. The white pigment should be loaded into the white region at a level of 3.5% to 35% by weight of the white region. The white pigment may be loaded into the white region by using a masterbatch material containing a propylene-based carrier polymer and high levels (i.e. 50%) of the white pigment.

Ideally, the white region is located as far from the sealing region as possible. Accordingly, the white region is ideally located on the major surface of the white multilayer film, opposite of the surface that includes the sealing region. In some embodiments the thickness of the white region is 32%, or 30% or less as compared to the total thickness of the white multilayer film.

EXAMPLES AND DATA

Test 1/Example 1

Example 1 stain resistant packaging film was produced having a sealing region, a blocking region and a white region. First, a three-layer white multilayer film was produced by coextrusion. Each layer of the white multilayer film corresponds to one of the regions of the stain resistant packaging film described herein and is outlined in Table 1 below. The three-layer film was run as a coextruded structure on a blown film line with a total thickness of about 101.6 microns. In Example 1, each of the regions contains one layer.

The white multilayer film was then laminated to create the stain resistant packaging film structure of (12 microns OPET coated with aluminum oxide)/print/adhesive/60 ga BON/ (white multilayer film). This film had good performance in retorting trials, displaying considerably less staining than a comparable material that contained white pigment closer to the sealing surface of the film.

TABLE 1

White multilayer film for Test 1

| Layer (Thickness, Volume Ratio) | Layer Components (by weight) |
|---|---|
| Sealing Region/Layer (29.2 microns, 28.75%) | 65% PP copolymer 1<br>25% PP copolymer 2<br>10% polypropylene homopolymer |
| Blocking Region/Layer (39.4 microns, 38.75%) | 40% PP copolymer 1<br>10% PP copolymer 2<br>50% polypropylene homopolymer |
| White Region/Layer (33.0 microns, 32.5%) | 53% PP copolymer 1<br>22% PP copolymer 2<br>25% white pigment masterbatch |

PP copolymer 1 is a heterophasic polypropylene copolymer that has a dispersed phase of EP rubber with 10-15% ethylene and a continuous phase of homopolymer PP
PP copolymer 2 is a heterophasic polypropylene copolymer that has a dispersed phase of EP rubber and a continuous phase of a propylene-ethylene random copolymer
White pigment masterbatch is a polypropylene homopolymer carrier with 50% titanium dioxide loading, by weight Test 2/Examples 2-4 and Comparative Examples A-B Five white multilayer films were produced by a blown film process; Examples 2-4 and Comparative Examples A and B. Each film had a sealing region, a blocking region and a white region, each region being a single layer (i.e. the films had three layers), and the details of the film structure and layer contents are summarized in Table 2.

The white multilayer films were heat sealed into three-side seal pouches having the sealing region on the interior surface of the pouch, contacting the product. The product loaded into the pouches was a blend of ketchup, olive oil, black pepper and turmeric. The pouches were hermetically sealed and processed in a retort chamber.

TABLE 2

White multilayer film Details for Test 2

| Film | | Sealing Region | Blocking Region | White Region |
|---|---|---|---|---|
| A | layer thickness | 31.8 micron | 38.1 micron | 31.7 micron |
| | layer volume ratio (layer to film) | 31.3% | 37.5% | 31.2% |
| | PP copolymer 1 weight ratio | 65% | 53% | 65% |
| | PP copolymer 2 weight ratio | 25% | 22% | 25% |
| | hPP weight ratio | 10% | — | 10% |
| | white pigment MB weight ratio | — | 25% | — |
| B | layer thickness | 32.8 micron | 39.2 micron | 29.6 micron |
| | layer volume ratio (layer to film) | 32.3% | 38.6% | 29.1% |
| | PP copolymer 1 weight ratio | 65% | 53% | 53% |

TABLE 2-continued

White multilayer film Details for Test 2

| Film | | Sealing Region | Blocking Region | White Region |
|---|---|---|---|---|
| | PP copolymer 2 weight ratio | 25% | 22% | 22% |
| | hPP weight ratio | 10% | — | — |
| | white pigment MB weight ratio | — | 25% | 25% |
| 2 | layer thickness | 31.5 micron | 42.0 micron | 28.1 micron |
| | layer volume ratio (layer to film) | 31.0% | 41.3% | 27.7% |
| | PP copolymer 1 weight ratio | 65% | 58% | 53% |
| | PP copolymer 2 weight ratio | 25% | 22% | 22% |
| | hPP weight ratio | 10% | 20% | — |
| | white pigment MB weight ratio | — | — | 25% |
| 3 | layer thickness | 32.0 micron | 42.8 micron | 26.8 micron |
| | layer volume ratio (layer to film) | 31.5% | 42.1% | 26.4% |
| | PP copolymer 1 weight ratio | 65% | 58% | 38% |
| | PP copolymer 2 weight ratio | 25% | 22% | 22% |
| | hPP weight ratio | 10% | 20% | — |
| | white pigment MB weight ratio | — | — | 40% |
| 4 | layer thickness | 33.2 micron | 44.5 micron | 23.9 micron |
| | layer volume ratio (layer to film) | 32.7% | 43.8% | 23.5% |
| | PP copolymer 1 weight ratio | 65% | 58% | 8% |
| | PP copolymer 2 weight ratio | 25% | 22% | 22% |
| | hPP weight ratio | 10% | 20% | — |
| | white pigment MB weight ratio | — | — | 70% |

PP copolymer 1 is a heterophasic polypropylene copolymer that has a dispersed phase of EP rubber with 10-15% ethylene and a continuous phase of homopolymer PP
PP copolymer 2 is a heterophasic polypropylene copolymer that has a dispersed phase of EP rubber and a continuous phase of a propylene-ethylene random copolymer
hPP is a polypropylene homopolymer
white pigment MB is a polypropylene homopolymer carrier with 50% titanium dioxide loading, by weight After retort processing, the pouches were emptied and evaluated for staining performance. The relative level of staining was evaluated by comparison of the yellowness index (Yi) measured according to ASTM D1925 using an X-Rite Color i5 model spectrophotometer having a 25 mm aperture. For each example film, six measurements were recorded and the average is reported. A higher yellowness index indicates that the film is more yellow and therefore more highly stained. Results of the staining measurements are given in Table 3.

TABLE 3

Staining Results for Test 2

| Sample | Average Yellowness Index |
|---|---|
| Comp. Ex. A | 65 |
| Comp. Ex. B | 40 |
| Example 2 | 34 |
| Example 3 | 31 |
| Example 4 | 29 |

Embodiments

A. A stain resistant packaging film for retort processing comprising a white multilayer film, the white multilayer film comprising:

a sealing region, the sealing region located on an exposed surface of the packaging film,
a white region comprising a white pigment in an amount from 3.5% to 35% by weight and a propylene-based polymer, and
a blocking region, the blocking region located between the sealing region and the white region,
wherein
the sealing region and the blocking region each comprise a propylene-based polymer and are each essentially free from the white pigment, and
a combined thickness of the sealing region and the blocking region is at least 70% of a white multilayer film thickness.

B. The stain resistant packaging film according to any previous embodiment wherein the blocking region comprises a blend of a propylene-ethylene copolymer and a polypropylene homopolymer in an amount of at least 10% by weight.

C. The stain resistant packaging film according to any previous embodiment wherein the blocking region comprises a rubber modified polypropylene copolymer in an amount between 0% and 10% by weight.

D. The stain resistant packaging film according to any previous embodiment wherein the sealing region comprises a blend of a rubber modified polypropylene copolymer and a homopolymer polypropylene of up to 10%.

E. The stain resistant packaging film according to any previous embodiment wherein the white multilayer film thickness is between 50 microns and 500 microns.

F. The stain resistant packaging film according to any previous embodiment further comprising printed indicia.

G. The stain resistant packaging film according to any previous embodiment wherein the white multilayer film is free from EVOH or polyamide.

H. The stain resistant packaging film according to any previous embodiment further comprising an external abuse layer and a barrier layer, the barrier layer located between the external abuse layer and the white multilayer film.

I. The stain resistant packaging film according to embodiment H wherein the barrier layer is an inorganic oxide coating.

J. The stain resistant packaging film according to embodiment H or I wherein both the external abuse layer and the barrier layer are transparent, and the white region of the white multilayer film can be viewed through the external abuse layer.

K. A packaged product comprising the stain resistant packaging film according to any previous embodiment and a food product, wherein the white region of the multilayer film has been stained by the food product during a retort sterilization process.

L. A stain resistant packaging film for retort processing comprising a white multilayer film, the white multilayer film comprising:
a sealing region, the sealing region located on an exposed surface of the packaging film,
a white region, and
a blocking region, the blocking region located between the sealing region and the white region,
wherein
the white region comprises a propylene-based polymer and a white pigment in an amount from 3.5% to 35% by weight,
the sealing region and the blocking region each comprise a propylene-based polymer and are each essentially free from the white pigment, and
a combined thickness of the sealing region and the blocking region is at least 68.6 microns.

M. The stain resistant packaging film according to embodiment L wherein the blocking region comprises a blend of a propylene-ethylene copolymer and a polypropylene homopolymer in an amount of at least 10% by weight.

N. The stain resistant packaging film according to embodiment L wherein the blocking region comprises a rubber modified polypropylene copolymer in an amount between 0% and 10% by weight.

O. The stain resistant packaging film according to embodiment L, M or N wherein the sealing region comprises a blend of a rubber modified polypropylene copolymer and a homopolymer polypropylene of up to 10%.

P. A stain resistant packaging film for retort processing comprising an external abuse layer, a barrier layer and a white multilayer film, the white multilayer film comprising a first major surface and a second major surface and comprising:
a sealing region comprising a polypropylene-based polymer, the sealing region located on the first major surface of the white multilayer film and on an exposed surface of the packaging film, and
a white region, the white region comprising a white region thickness that is 30% or less of a white multilayer film thickness, the white region located on the second major surface of the white multilayer film,
wherein the barrier layer is between the external abuse layer and the white multilayer film, wherein the white region comprises a white pigment between 3.5% and 35% by weight, and wherein the white multilayer film is otherwise essentially free of white pigment.

Q. The stain resistant packaging film according to embodiment P further comprising a blocking region located between the sealing region and the white region.

R. The stain resistant packaging film according to claim embodiment Q wherein the blocking region comprises a polypropylene homopolymer in an amount of at least 20% by weight.

S. The stain resistant packaging film according to embodiment P, Q or R wherein the white multilayer film is free from EVOH or polyamide.

T. A packaged product comprising the stain resistant packaging film according to any of embodiments L through S and a food product, wherein the white region of the multilayer film has been stained by the food product during a retort sterilization process.

What is claimed is:
1. A stain resistant packaging film for retort processing comprising a white multilayer film, the white multilayer film comprising:
a sealing region, the sealing region located on an exposed surface of the packaging film,
a white region comprising a white pigment in an amount from 3.5% to 35% by weight and a propylene-based polymer, and
a blocking region, the blocking region located between the sealing region and the white region,
wherein
the sealing region and the blocking region each comprise a propylene-based polymer and are each essentially free from the white pigment, and
a combined thickness of the sealing region and the blocking region is at least 70% of a white multilayer film thickness.
2. The stain resistant packaging film according to claim 1 wherein the blocking region comprises a blend of a propyl- ene-ethylene copolymer and a polypropylene homopolymer in an amount of at least 10% by weight.

3. The stain resistant packaging film according to claim 1 wherein the blocking region comprises a rubber modified polypropylene copolymer in an amount between 0% and 10% by weight.

4. The stain resistant packaging film according to claim 1 wherein the sealing region comprises a blend of a rubber modified polypropylene copolymer and a homopolymer polypropylene of up to 10%, by weight.

5. The stain resistant packaging film according to claim 1 wherein the white multilayer film thickness is between 50 microns and 500 microns.

6. The stain resistant packaging film according to claim 1 further comprising printed indicia.

7. The stain resistant packaging film according to claim 1 wherein the white multilayer film is free from ethylene vinyl alcohol copolymer (EVOH) or polyamide.

8. The stain resistant packaging film according to claim 1 further comprising an external abuse layer and a barrier layer, the barrier layer located between the external abuse layer and the white multilayer film.

9. The stain resistant packaging film according to claim 8 wherein the barrier layer is an inorganic oxide coating.

10. The stain resistant packaging film according to claim 8 wherein both the external abuse layer and the barrier layer are transparent, and the white region of the white multilayer film can be viewed through the external abuse layer.

11. A packaged product comprising the stain resistant packaging film according to claim 1 and a food product, wherein the white region of the multilayer film has been stained by the food product during a retort sterilization process.

12. A stain resistant packaging film for retort processing comprising a white multilayer film, the white multilayer film comprising:
   a sealing region, the sealing region located on an exposed surface of the packaging film,
   a white region, and
   a blocking region, the blocking region located between the sealing region and the white region,
wherein
   the white region comprises a propylene-based polymer and a white pigment in an amount from 3.5% to 35% by weight,
   the sealing region and the blocking region each comprise a propylene-based polymer and are each essentially free from the white pigment, and
   a combined thickness of the sealing region and the blocking region is at least 68.6 microns.

13. The stain resistant packaging film according to claim 12 wherein the blocking region comprises a blend of a propylene-ethylene copolymer and a polypropylene homopolymer in an amount of at least 10% by weight.

14. The stain resistant packaging film according to claim 12 wherein the blocking region comprises a rubber modified polypropylene copolymer in an amount between 0% and 10% by weight.

15. The stain resistant packaging film according to claim 12 wherein the sealing region comprises a blend of a rubber modified polypropylene copolymer and a homopolymer polypropylene of up to 10%, by weight.

16. A stain resistant packaging film for retort processing comprising an external abuse layer, a barrier layer and a white multilayer film, the white multilayer film comprising a first major surface and a second major surface and comprising:
   a sealing region comprising a polypropylene-based polymer, the sealing region located on the first major surface of the white multilayer film and on an exposed surface of the packaging film, and
   a white region, the white region comprising a white region thickness that is 30% or less of a white multilayer film thickness, the white region located on the second major surface of the white multilayer film,
   wherein the barrier layer is between the external abuse layer and the white multilayer film, wherein the white region comprises a white pigment between 3.5% and 35% by weight, and wherein the white multilayer film is otherwise essentially free of white pigment.

17. The stain resistant packaging film according to claim 16 further comprising a blocking region located between the sealing region and the white region.

18. The stain resistant packaging film according to claim 17 wherein the blocking region comprises a polypropylene homopolymer in an amount of at least 20% by weight.

19. The stain resistant packaging film according to claim 17 wherein the white multilayer film is free from ethylene vinyl alcohol copolymer (EVOH) or polyamide.

20. A packaged product comprising the stain resistant packaging film according to claim 16 and a food product, wherein the white region of the multilayer film has been stained by the food product during a retort sterilization process.

* * * * *